(12) United States Patent
Zhang et al.

(10) Patent No.: US 9,521,469 B2
(45) Date of Patent: Dec. 13, 2016

(54) CARRIAGE OF QUALITY INFORMATION OF CONTENT IN MEDIA FORMATS

(71) Applicant: Futurewei Technologies, Inc., Plano, TX (US)

(72) Inventors: Shaobo Zhang, Shenzhen (CN); Xin Wang, Ranchos Palos Verdes, CA (US)

(73) Assignee: Futurewei Technologies, Inc., Plano, TX (US)

( * ) Notice: Subject to any disclaimer, the term of this patent is extended or adjusted under 35 U.S.C. 154(b) by 37 days.

(21) Appl. No.: 14/256,650

(22) Filed: Apr. 18, 2014

(65) Prior Publication Data

US 2014/0317668 A1  Oct. 23, 2014

Related U.S. Application Data

(60) Provisional application No. 61/814,060, filed on Apr. 19, 2013.

(51) Int. Cl.
| | | |
|---|---|---|
| *H04N 7/173* | (2011.01) | |
| *H04N 21/84* | (2011.01) | |
| *H04N 21/442* | (2011.01) | |
| *H04N 21/2343* | (2011.01) | |
| *H04N 21/6587* | (2011.01) | |
| *H04N 21/845* | (2011.01) | |
| *H04N 21/854* | (2011.01) | |

(52) U.S. Cl.
CPC ........ *H04N 21/84* (2013.01); *H04N 21/23439* (2013.01); *H04N 21/442* (2013.01); *H04N 21/6587* (2013.01); *H04N 21/8456* (2013.01); *H04N 21/85406* (2013.01)

(58) Field of Classification Search
CPC ...................................................... H04N 21/84
See application file for complete search history.

(56) References Cited

U.S. PATENT DOCUMENTS

| | | | | |
|---|---|---|---|---|
| 2011/0096828 | A1* | 4/2011 | Chen et al. .............. | 375/240.02 |
| 2012/0233345 | A1* | 9/2012 | Hannuksela ................. | 709/231 |
| 2014/0019593 | A1* | 1/2014 | Reznik et al. ................ | 709/219 |

OTHER PUBLICATIONS

"Information Technology—Dynamic Adaptive Streaming over HTTP (DASH)—Part 1: Media Presentation Description and Segment Formats," International Standard, ISO/IEC 23009-1, First Edition, Apr. 1, 2012, 134 pages.

(Continued)

*Primary Examiner* — Kyu Chae
(74) *Attorney, Agent, or Firm* — Conley Rose, P.C.

(57) ABSTRACT

A method for managing quality information for dynamic adaption in content delivery, wherein the method comprises selecting a granularity level for an encoded media data, computing a plurality of quality metrics for the encoded media data at the selected granularity level, wherein the quality metrics are measures of coding quality of the encoded media data, generating a quality track comprising the plurality of quality metrics, and storing the quality track on a media content server separate from other tracks that are associated with the encoded media data. Also disclosed is a network device comprising a processor configured to select a granularity level for an encoded media data, and compute a plurality of quality metrics that indicate coding quality of the encoded media data at the selected granularity level, and a transmitter coupled to the processor and configured to send the quality track towards a user of the media data.

20 Claims, 13 Drawing Sheets

(56) References Cited

OTHER PUBLICATIONS

"Information Technology—MPEG Systems Technologies—Part 10: Carriage of Timed Metadata of Media in ISO Base Media File Format," ISO/IEC JTC 1/SC 29 N, ISO/IEC CD 23001-10, ISO/IEC JTC 1/SC 29/WG 11, Jan. 17, 2014, 23 pages.

"Information Technology—Dynamic Adaptive Streaming Over HTTP (DASH)—Part 1: Media Presentation Description and Segment Formats / Amd 2," ISO/IEC JTC1/SC 29 N 14443, ISO/IEC 23009-1:201x/PDAM2, ISO/IEC JTC 1/SC 29/WG 11, Apr. 11, 2014, 16 pages.

"Information Technology—Coding of Audio-Visual Objects—Part 12: ISO Base Media File Format," International Standard, ISO/IEC 14496-12, 4th Edition, 2012, 190 pages.

Zhang, S., et al., "Signalling of Media Quality Related Information for DASH," International Organisation for Standardisation, ISO/IEC JTC/SC29/WG11, MPEG2013/m2xxxx, Incheon, Korea, Apr. 2013, 4 pages.

Reznik, Y., A., "Proposed Test Sequences and Framework for DASH on Quality Signaling Contribution," International Organisation for Standardization, ISO/IEC/SC9/WG11, MPEG2012/m25996, Shanghai China, Oct. 14, 2012, 5 pages.

Reznik, Y., et al., "ISO/IEC 23001-10 CD: Carriage of Timed Metadata Metrics of Media in ISO Based Media File Format," ISO/IEC JTC1/SC29/WG11, MPEG2014/N14129, San Jose, USA, Jan. 2014, 10 pages.

Zhang, S., et al., "In Band Signalling for Quality Driven Adaptation," International Organisation for Standardisation, ISO/IEC JTC1/CN29,WG11, MPEG2013/m28168, Geneva, Switzerland, Jan. 2013, 4 pages.

Zhang, S., et al., "Experiment Results on Quality Driven Streaming," International Organization for the Standardisation, ISO/IEC JTC1/SC29/WG11, MPEG2013/m28172, Geneva, Switzerland, Jan. 2013, 12 pages.

Giladi, A., et al., "Descriptions of Core Experiments," International Organisation for Standardisation, ISO/IEC JTC1/SC29/WG11, MPEG2013/N13286, Geneva, Switzerland, Jan. 2013, 36 pages.

Bray, T., et al., "Extensible Markup Language (XML) 1.0 (Fifth Edition)," W3C Recommendation, Nov. 26, 2008, 37 pages.

Zhang, Shaobo, et al., U.S. Appl. No. 61/752,796; "System and Method for In-Band Signaling of Segment Quality for Smooth Adaptive Streaming," Filed Jan. 15, 2013.

Zhang, Shaobo, et al., "U.S. Appl. No. 61/752,831, System and Method for Out-of-Band Signaling of Quality Information," Filed Jan. 15, 2013.

\* cited by examiner

CARRIAGE OF QUALITY INFORMATION OF CONTENT IN MEDIA FORMATS

CROSS-REFERENCE TO RELATED APPLICATIONS

The present application claims priority to U.S. Provisional Patent Application 61/814,060, filed Apr. 19, 2013 by Shaobo Zhang, et. al., and entitled "Method And System For Carriage Of Quality Information Of Content In Media Formats", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media contents to subscribers and/or users employing different encryption schemes, different coding schemes, and/or differently configured coder-decoder (codec) suited for different devices (e.g. televisions, notebook computers, and mobile handsets). The media content provider may support a plurality of media encoders and/or decoders (codecs), media players, video frame rates, spatial resolutions, bit-rates, video formats, or combinations thereof. A piece of media content may be converted from a source or original representation to various other representations to suit the different user devices.

Streaming media may refer to a server application transmitting a media content (e.g. encoded and/or compressed video and/or audio) in a streaming or continuous fashion while a client application receives and displays the media content in real time (e.g. before the entire media content is received and stored). The quality of streaming media content may vary with network conditions. For example, the quality of the media content may be high when the network condition is good (e.g. low packet error rate, low loss rate, and/or high available bandwidth for media data delivery), whereas the quality of the media content may be low when the network condition is bad (e.g. high packet error and/or loss rate). Dynamic adaptive streaming media may allow a client to dynamically request different encoded versions (e.g. with different bandwidth requirements) of a media content based on varying network conditions and/or client's resources.

SUMMARY

A carriage of quality information of media content mechanism is disclosed herein. In one embodiment, the disclosure includes a method for managing quality information for dynamic adaption in content delivery, wherein the method comprises selecting a granularity level for an encoded media data, computing a plurality of quality metrics for the encoded media data at the selected granularity level, wherein the quality metrics are measures of coding quality of the encoded media data, generating a quality track comprising the plurality of quality metrics, and storing the quality track on a media content server separate from other tracks that are associated with the encoded media data.

In another example embodiment, the disclosure includes a network device comprising a processor configured to select a granularity level for an encoded media data, compute a plurality of quality metrics that indicate coding quality of the encoded media data at the selected granularity level, and generate a first quality track comprising the plurality of quality metrics, a memory coupled to the processor and configured to store the first quality track separately from other tracks associated with the encoded media data, wherein the first quality track comprises a one-to-one mapping association with the encoded media data at the selected granularity level, and a transmitter coupled to the processor and the memory and configured to send the first quality track towards a user of the media data.

In yet another example embodiment, the disclosure includes a method for carrying quality information of a media data in an International Organization for Standardization (ISO)-Base Media File Format (ISO-BMFF), comprising deriving the quality information of the media data on different granularity levels for different applications, wherein the media data comprises digital compressed media content, decoupling the quality information from the media data by storing the quality information in a quality metadata track, and associating the quality metadata track to a media track that carries the media data such that a one-to-one mapping exists between the quality metadata track and the media track at each of the granularity levels.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
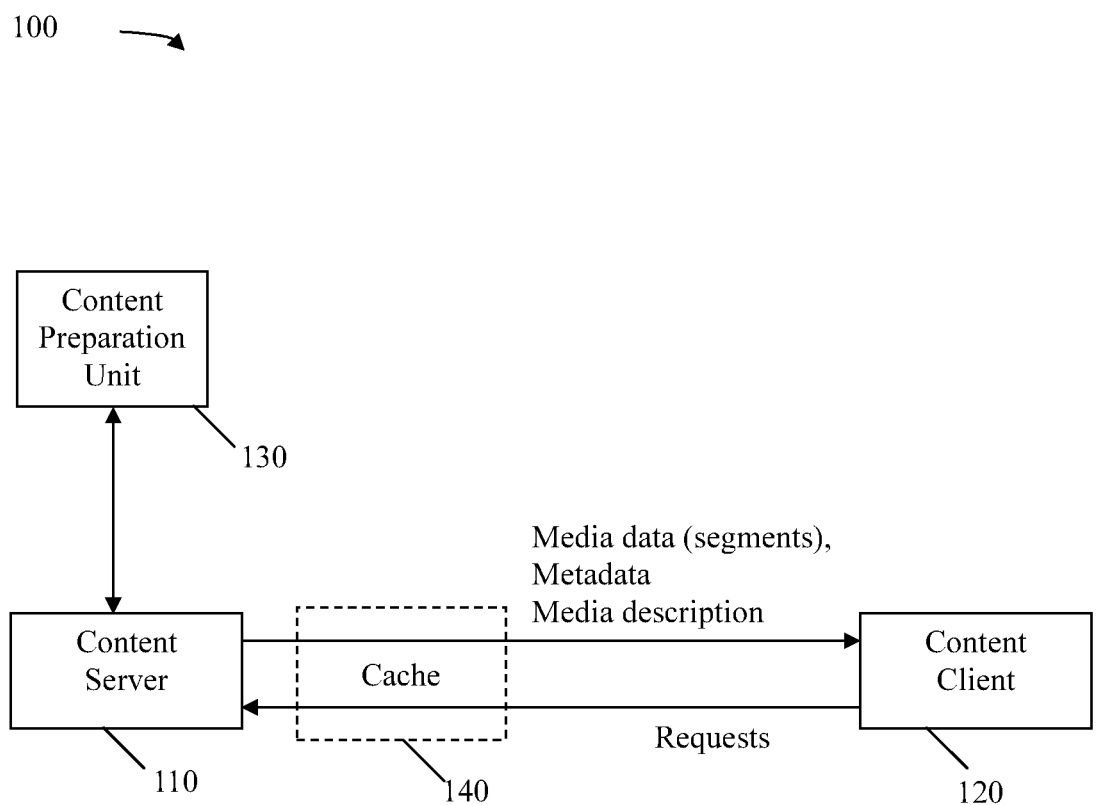
FIG. 1 is a schematic diagram of an embodiment of a content delivery system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents A media content (e.g. video and/or audio) may be converted from a source or an original representation to various other representations through various coding schemes (e.g. compressions) prior to distributing or delivering to a client and/or a subscriber over the Internet. Coding schemes may be designed to closely approximate the source or the original representation, while simultaneously delivering the smallest amount of data (e.g. to maximize bandwidth utilization). Quality of an encoded media content may be determined by the amount of data that is lost when the content is encoded (e.g. compressed) and/or when the content is decoded (e.g. decompressed). Many factors may affect the loss of data in an encoding process. For example, the more complex an original data and the higher the compression ratio, the more detail may be lost in an encoding process. Thus, the quality of the encoded media content may vary depending on the employed coding schemes. However, the quality of the encoded media content may also vary depending on the complexity of the source. As such, bit rate information may not correlate with the quality of the encoded media content. Some coding schemes may employ variable bit rate (VBR) encoding, such as unconstrained VBR, to encode media content at the highest quality while within a pre-determined average bandwidth. However, the quality of the encoded media content may not be constant, as fluctuations of quality may occur in content encoding.

ISO/International Electrotechnical Commission (IEC) document 14496-12($4^{th}$ edition), entitled "Information technology—Coding of audio-visual objects—part 12: ISO base media file format", which is incorporated herein by reference, may define a ISO-BMFF for carrying timed media information for a media presentation (e.g. a collection of media content) in a flexible and extensible format that may facilitate interchange, management, editing, and presentation of media content. ISO-BMFF files may carry information in container boxes. For example, a media data box may carry media data (e.g. video picture frames and/or audio frames) of a media presentation and a movie box may carry metadata of the media presentation. A movie box may comprise a plurality of sub-boxes that carry metadata associated with the media data. For example, a movie box may comprise a video track box that carries descriptions of video data in a media box, an audio track box that carries descriptions of audio data in the media box, and a hint track box that carries hints for streaming and/or playback of the video data and/or audio data.

Disclosed herein are mechanisms for carrying quality information of a media content in a media file, where the media content comprises encoded media data. Quality information may refer to the coding quality of the media content. Quality of the encoded media data may be measured and represented in several granularity levels. Some examples of granularity levels may include a time interval of a sample, a track run (e.g. a collection of samples), a track fragment (e.g. a collection of track runs), a movie fragment (e.g. a collection of track fragments), and a sub-segment (e.g. a collection of movie fragments). A content producer may select a granularity level, compute quality metrics for a media content at the selected granularity level, and store the quality metrics on a content server. A media content may comprise one or more encoded versions of media data or representations. The encoded media data may be represented as segments in a representation. The content producer may provide an association between the quality metrics and the encoded media data to enable a client to retrieve the quality metrics and correlate the quality metrics with the encoded media data. For example, a client may determine the most suitable segments for download based on the quality metrics in addition to network conditions and/or client's resources. In an embodiment, the quality metrics may be carried in a quality track, which may be a separate metadata track in an ISO-BMFF file and may be suitable for retrieval in dynamic adaptive streaming applications. The quality track may be suitable for carrying quality metrics for fragmented and/or un-fragmented media data. Each quality track may comprise a one-to-one mapping relationship with a media track at a granularity level represented by the quality track. Quality metric may be measured and/or represented in several forms, for example, a peak signal-to-noise-ratio (PSNR) or a mean opinion score (MOS).

FIG. 1 is a schematic diagram of an embodiment of a content delivery system 100. System 100 may comprise a content server 110, a content client 120, and a content preparation unit 130. The content server 110 may be communicatively coupled to the content preparation unit 130 and the content client 120 via a network (e.g. Internet, wireline network, or wireless network). The content client 120 may be communicatively coupled to the content servers 110 via the network.

The content server 110 may be any hardware computer server (e.g. Hypertext Transfer Protocol (HTTP) server) configured to send and receive data over a network for content delivery (e.g. via a dynamic adaptive streaming scheme). The content server 110 may store a media content (e.g. video, audio, text, or combinations thereof) and may deliver (e.g. via streaming mechanisms) the media content to a content client 120 upon a request from the content client 120. The media content may be in a form of video, audio, text, or combinations thereof. The media content stored in the content server 110 may be generated or prepared by a content preparation unit 130. The content server 110 may comprise a cache 140. The cache 140 may be any device configured to temporarily store information for the media content. Alternatively, the cache 140 may be located in another server (e.g. computer hardware server), which may be a server close to the content server 110 and/or the content client 120 in the network.

The content preparation unit 130 may be a program or an application located in a content server 110 or other servers (e.g. computer hardware servers) provided by a content provider. A content provider may employ a content preparation unit 130 to generate and prepare a media content. For example, the content preparation unit 130 may produce a plurality of encoded versions of media data (e.g. audio and/or video) by employing different coding schemes. The content preparation unit 130 may store the different encoded versions of the media data according to some pre-determined media file format and may store media data files on the content server 110 or other servers (e.g. computer hardware servers) provided by the content provider. The content preparation unit 130 may divide an encoded version of a media content into a plurality of segments and may store the segments collectively in a single media file or individually in different media files. Alternatively, the content preparation unit 130 may store more than one encoded version of a media content in each media file. In addition, the content preparation unit 130 may include one or more media description files to indicate information (e.g. media types, bandwidth requirements, duration, locations of media data files, etc.) of the media content and/or advertise the media content.

The content client 120 may be a program or an application implemented on a user device (e.g. content subscriber). The content client 120 may also be a web client that accesses the client server 110 in a web platform. The content client 120 may be implemented in any user device, such as a mobile phone, notebook, computer, television, etc. The content client 120 may request media content and the client server 110 may deliver the media content upon the client's 120 request.

In an embodiment of a content distribution network (CDN), content server 110 may be part of a content provider or may be a node in the CDN. For example, a content server 110 may be an edge node in a CDN, and may operate as a last hop from a content provider to a content client 120. The content provider may generate the media content and may transmit the media content to a CDN node.

In an embodiment of dynamic adaptive steaming, a content client 120 may send a request to a content server 110 for media content. In response to the content client's 120 request, the content server 110 may deliver one or more media description files to the content client 120. The media description file may be delivered using HTTP, unicast, multi-cast, or any other transport mechanisms. The content client 120 may parse the media description file to retrieve information regarding the media content, such as timing of the program, availability of media content, media types, resolutions, minimum and/or maximum bandwidths, existence of various encoded alternatives of multimedia components, accessibility features and required digital right management (DRM), location of each media component (e.g. audio data segments, video data segments, etc.) on the network, and/or other characteristic of the media content. The content client 120 may select an appropriate encoded version of the media content according to the information retrieved from the media description file and may start streaming the media content by fetching media segments carried in ISO-BMFF files located on the content server 110. It should be noted that a media content may be stored on one or more content servers (e.g. content server 110). As such, a content client 120 may download segments from different content servers (e.g. to maximize bandwidth utilization). The content client 120 may render the downloaded media appropriately so as to provide a content service (e.g. streaming service) to a user of the content client 120. The content client 120 may retrieve the segments based on locations (e.g. Uniform Resource Locations (URLs)) specified in a media description file or from the cache 140, which may provide better efficiency (e.g. less latency).

An example of dynamic adaptive streaming may be Dynamic Adaptive Streaming over HTTP (DASH), which may define a manifest format, Media Presentation Description (MPD), and segment formats in ISO-BMFF and/or Moving Picture Experts Group (MPEG) Transport Stream, as described in ISO/IEC document 13818-1, entitled "Information Technology—Generic Coding of Moving Pictures and Associated Audio Information: Systems". In a DASH system, a media presentation may comprise an MPD and one or more ISO-BMFF files. The media content may be represented in segments with various coding schemes. The MPD may be an extensible markup language (XML) file or document describing a piece of media content, such as various representations (e.g. encoded versions) of the media content, URL addresses, and other characteristics. For example, the media content may comprise several media components (e.g. audio, video, and/or text), each of which may have different characteristics that are specified in the MPD. Each media component may comprise a plurality of media segments containing the parts of actual media content, and the segments may be stored collectively in a single file or individually in multiple files. Each segment may comprise a pre-defined byte size (e.g. 1,000 bytes) or an interval of playback time (e.g. two or five seconds) of the media content. The ISO-BMFF files may carry the segments and other metadata associated with the segments. The MPD and the ISO-BMFF files may be stored in one or more content servers (e.g. content servers 110). As such, the MPD, the segments, and/or metadata may be sent to a content client 120 from different servers.

Figure 2:
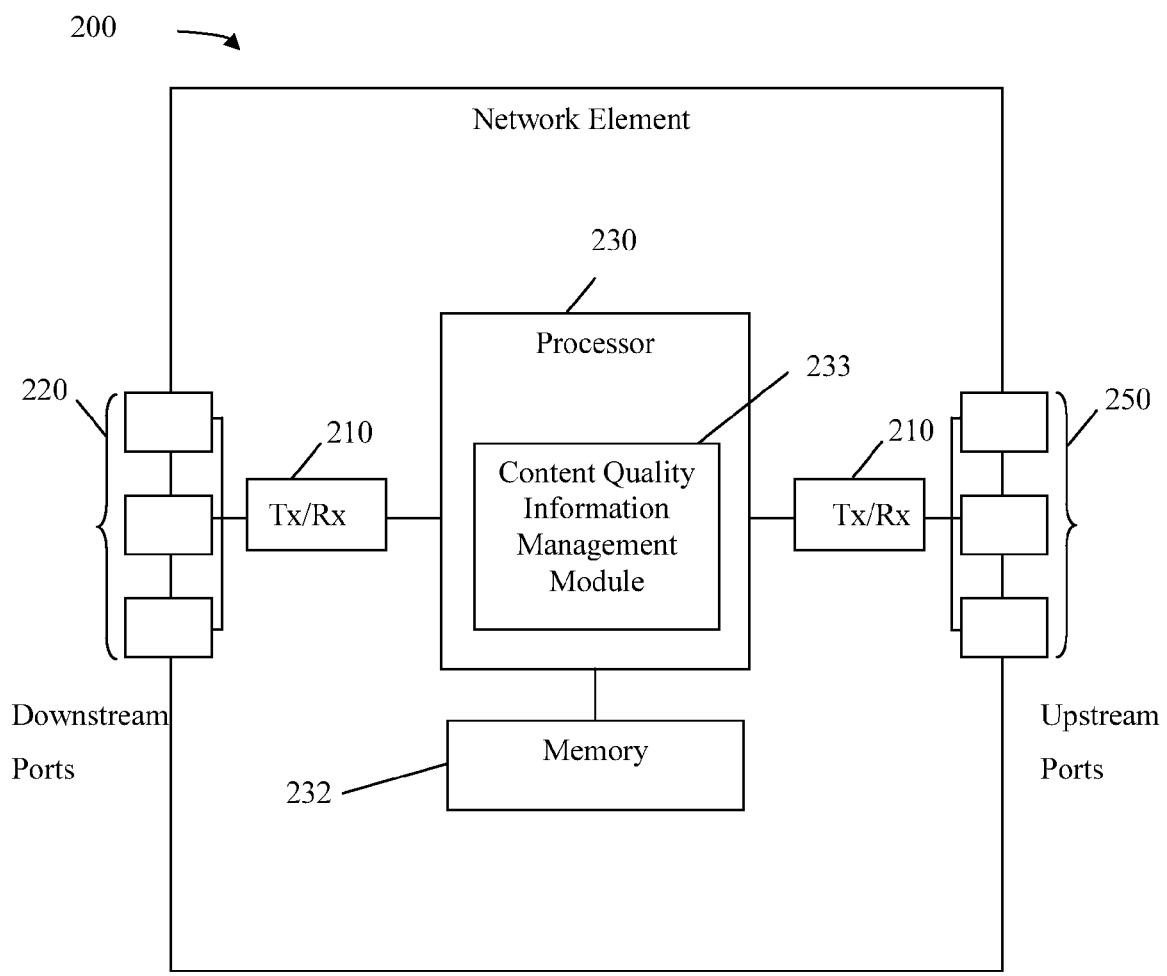
FIG. 2 is a schematic diagram of an embodiment of a network element (NE).

FIG. 2 is a schematic diagram of an example embodiment of an NE 200, which may act as a content server (e.g. content server 110), a cache (e.g. cache 140), a content preparation unit (e.g. content preparation unit 130), and/or a content client (e.g. content client 120) in a content delivery system (e.g. system 100). NE 200 may be configured to select granularity level for an encoded media data of a media content, measure coding quality, and/or store the measured quality metrics when acting as a content server and/or a content preparation unit. Alternatively, NE 200 may retrieve and/or evaluate quality metrics to determine segments for download when acting as a content client. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a content quality information management module 233, which may implement a content quality information management method 1000 and/or 1100 as discussed more fully below, as well as any other method discussed herein. In an alternative embodiment, the content quality information management module 233 may be implemented as instructions stored in the memory devices 232, which may be executed by processor 230. The memory device 232 may comprise a cache for temporarily storing content, e.g., a Random Access Memory (RAM). Additionally, the memory device 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
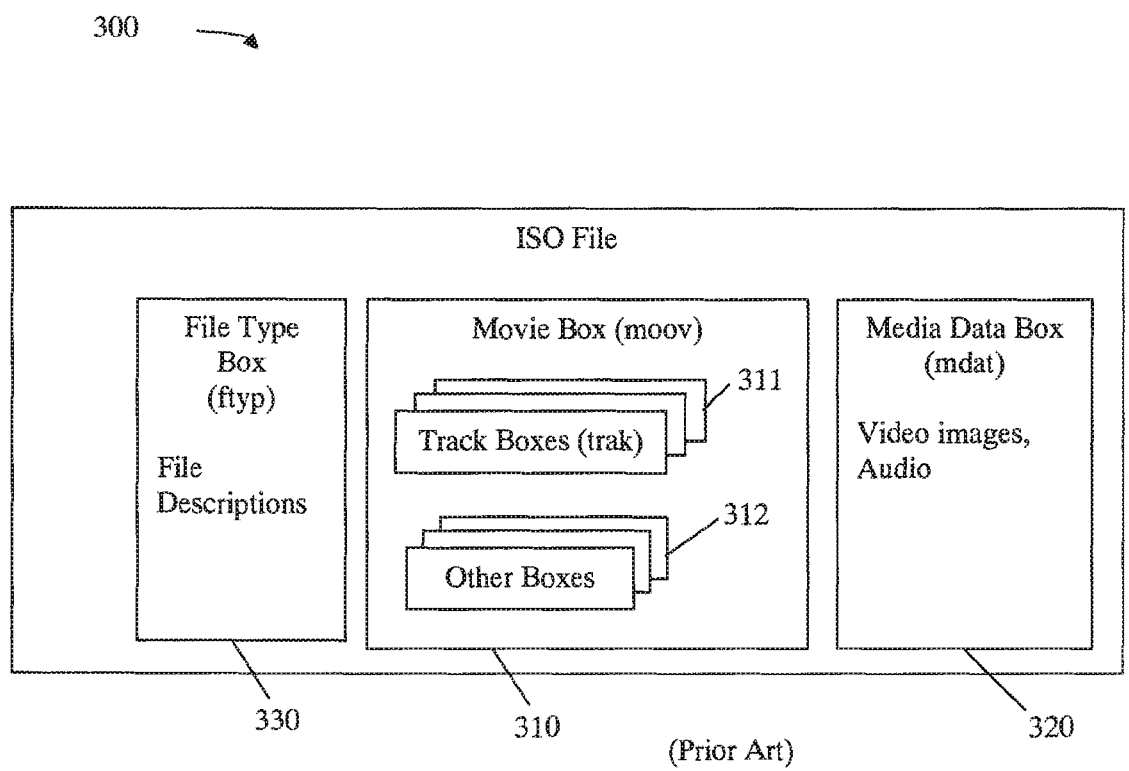
FIG. 3 is a schematic diagram of an embodiment of an ISO-BMFF file.

FIG. 3 is a schematic diagram of an embodiment of an ISO-BMFF file 300 as defined in ISO documents IEC 14496-12. The ISO-BMFF may be independent of any network protocols. As such, an ISO-BMFF file may be transported over any network. File 300 may be decomposed into a plurality of container boxes that carry objects and/or data associated with a media content or a media presentation. For example, file 300 may comprise a file type box (e.g. ftyp) 330, a movie box (e.g. moov) 310, and a media data box (e.g. mdat) 320.

A file type box 330 may comprise a file type that indicates a version number of an ISO specification and/or compatibility information of the file 300. A movie box 310 may comprise a plurality of track boxes (trak) 311 that carry metadata of a media presentation. The movie box 310 may further comprise other boxes 312 that carry miscellaneous information, which may affect the presentation of the media content. A media data box 320 may comprise interleaved and time-ordered media data (e.g. coded video images and/or audio frames) of the media presentation. The metadata may comprise descriptive information (e.g. display characteristics, durations, and/or timescale elements) of the media contents in the media presentation. The metadata in each track box 311 may be independent of each other. For example, one of the track boxes 311 may carry an audio description of audio data in the media data box 320, another track box 311 may carry a video description of a video data in the media data box 320, and yet another track box 311 may carry hints for streaming and/or playback of the media data in the media data box 320. The media data in the media data box 320 may be decoded based on information provided in the movie box 310. It should be noted that a track may be referred to as a timed sequence of related samples. For example, a media track may comprise a sequence of images or sampled audio, whereas a metadata track may comprise a sequence of metadata in the units of the metadata.

A media presentation may be divided into a plurality of segments in a temporal domain for delivery, where the segments may be stored in multiple files or collectively in a single file. A segment may be a minimal unit of data that is addressed individually (e.g. for delivery and download) in a media presentation. A segment may comprise a sequence of bytes that are packetized and/or time-stamped media data and may correspond to a portion (e.g. duration) of the timeline of a media presentation. For example, a media segment may be a four second portion of a live broadcast with a playout time at 0:42:38 and an end time at 0:42:42, and may be available within a three minutes time window. A segment may be decomposed into a plurality of units of media data at various granularity levels (e.g. in a temporal domain). In an embodiment, a segment may be divided into one or more sub-segments. A sub-segment may be further subdivided into one or more movie fragments. A movie fragment may be further subdivided into one or more track fragments. A track fragments may be further subdivided into one or more track runs. A track run may be further subdivided into one or more samples, where a sample may be defined as data associated with a single timestamp. For example, a sample may be an individual frame of video, a series of video frames in decoding order, or a compressed section of audio in decoding order.

A media description file (e.g. an MPD in a DASH system) and/or metadata of a media content may comprise performance information of the media content, such as minimum bandwidth, frame rate, audio sampling rate, and/or other bit rate information. A client (e.g. content client 120) may retrieve the performance information, and may evaluate the performance information, network conditions, and/or resources of the client's device (e.g. mobile phone, notebook computer, or work station) to determine the most suitable segments for download, streaming adaptation, and/or playback. However, the performance information may not indicate the coding quality of the media content. For example, coding quality may depend on a selected coding scheme (e.g. compression ratio), bit rate, and/or complexity of the original media data. A constant coding quality may be difficult to achieve with a specifically configured codec and/or some coding schemes, including unconstrained VBR encoding.

Figure 4:
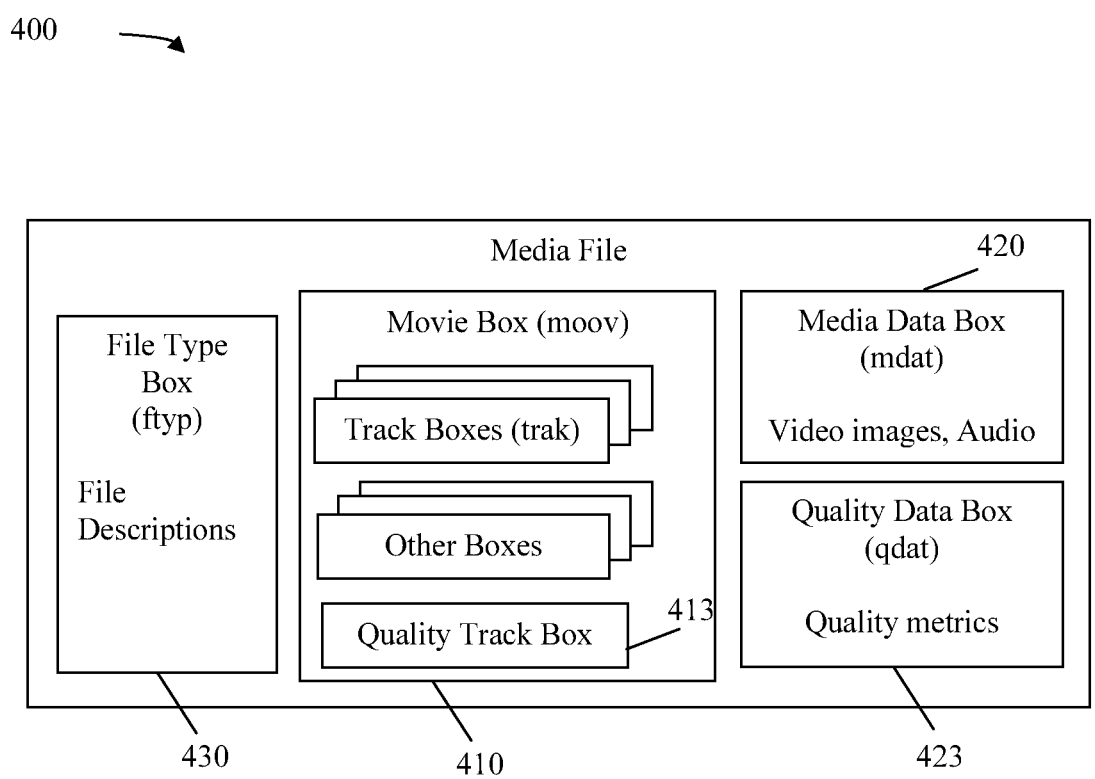
FIG. 4 is a schematic diagram of an embodiment of a media file comprising content quality information.

FIG. 4 is a schematic diagram of an embodiment of a media file 400 comprising content quality information. Media file 400 may be substantially similar to file 300. For example, media file 400 may comprise a file type box (e.g. ftyp) 430, a movie box (e.g. moov) 410, and a media data box (e.g. mdat) 420, which may be substantially similar to file type box 330, movie box 310, and media data box 320, respectively. However, file 400 may comprise an additional quality data box (e.g. qdat) 423 and the movie box 410 may comprise an additional quality track box 413. The quality track box 413 may carry global information for a quality track and the quality data box 423 may carry quality data for the quality track. The quality track may be associated with a media track in which the encoded media data may be stored in the media data box 420. As such, the quality data may comprise quality information of the encoded media data. The quality information may enable a client to make more intelligent streaming adaptation decisions, for example, to reduce quality fluctuations, improve user experience, and/or reduce bandwidth consumption. Coding quality may be measured at various granularity levels. For example, a quality metric may be computed for each sample, each track run, each track fragment, each movie fragment, and/or each sub-segment of the encoded media data, where a sample of encoded media data may correspond to a single video frame, a series of video frames in a decoding order, a compressed section of audio in a decoding order, or combinations thereof.

In some embodiments, a media content or presentation may comprise a plurality of representations (e.g. encoded versions). In such embodiments, a separate quality track (e.g. stored in quality track box 413 and quality data box 423) may be employed to carry quality metrics for each representation. In addition, a separate quality track may be employed to carry quality metrics at each granularity level. For example, one quality track may carry per sample quality metrics, another quality track may carry per track run quality metrics, etc. As such, a one-to-one mapping relationship may exist between a quality track and an encoded media data track at a granularity represented by the quality metrics in the quality track.

In some embodiments, a representation of a video comprising encoded video data (e.g. 2.5 megabits per second (Mbps) 720 pixels (p) Advanced Video Coding (AVC) video) may be associated with a plurality of representations of audio comprising encoded audio data (e.g. 96 kilobits per second (kbps) MPEG-4 Advanced Audio Coding (AAC) audio in different languages). In such embodiments, quality metrics for each audio or video representation may be indicated in separate quality tracks (e.g. stored in quality track box 413 and quality data box 423), for example, video quality metrics of the representation may be indicated in one quality track and audio quality metrics for each audio (e.g. language) may be indicated in a separate quality track. Each quality track may comprise a series of values and each value may represent a quality metric at a given granularity (e.g. sample, track run, track fragment, movie fragment, or subsegment). Alternatively, a single quality track may be employed to indicate quality metrics for the video, as well as all the audios. For example, a quality track may comprise a series of groups of values, where each group of values may comprise a video quality metric and one or more audio quality metrics. Similarly, a one-to-one mapping relationship may exist between a quality track and an encoded media data track at a granularity represented by the quality track. It should be noted that the signaling of quality information in quality tracks may be alternatively configured as determined by a person of ordinary skill in the art to achieve the same functionalities.

The signaling of quality information in a quality track (e.g. quality track box 413 and quality data box 423) as a separate metadata track may decouple quality information from media data and/or other metadata. Thus, quality information may be easily added, removed, and/or updated. The signaling of quality information in different granularities may enable flexibility for providing quality information at different granularities for different applications. Since each quality track may comprise a one-to-one mapping relationship with a media data track at granularity represented by the quality track, a client may correlate quality information and media data easily. In addition, quality metrics may be computed in various forms (e.g. PSNR, MOS, etc.) and each form of quality metric for an encoded media data may be signaled in separate or combined quality tracks. The disclosed mechanisms for signaling quality information of media content may support both un-fragmented and fragmented content in ISO-BMFF and may be suitable for dynamic adaptive streaming, such as DASH.

Figure 5:
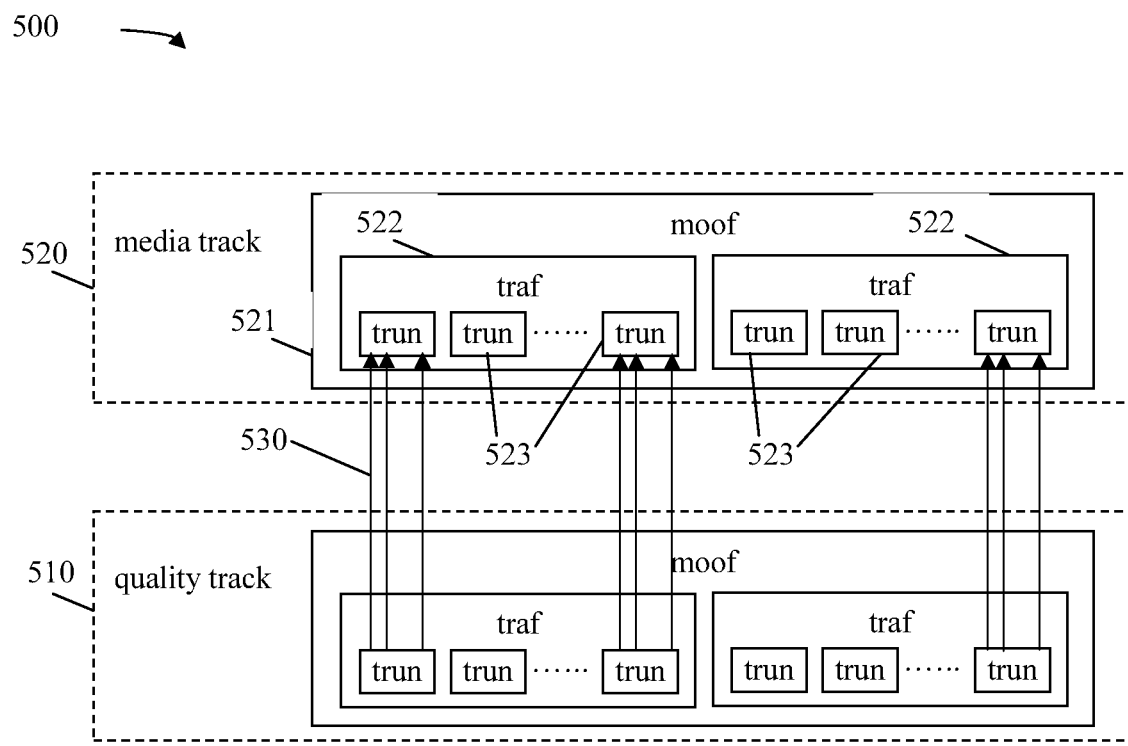
FIG. 5 illustrates an embodiment of an association method between a quality track and a media track at a sample granularity level.

FIG. 5 illustrates an embodiment of an association method 500 between a quality track 510 and a media track 520 at a sample granularity level. In method 500, the media track 520 may comprise a movie fragment (moof) 521. The movie fragment 521 may comprise a plurality of track fragments (traf) 522. Each track fragment 522 may comprise a plurality of track runs (trun) 523. Each track run 523 may comprise a plurality of samples, where a sample may refer to a video frame, a series of video frames in a decoding order, and/or a section of compressed audio in a decoding order. The quality track 510 may comprise a substantially similar structure as in the media track 520. However, the samples in the quality track 510 may be quality metrics 530 corresponding to coding quality of the media data samples in the media track 520. In the quality track 510, each quality metric 530 may be associated with a media sample in which the coding quality may be described by the quality metric 530.

Figure 6:
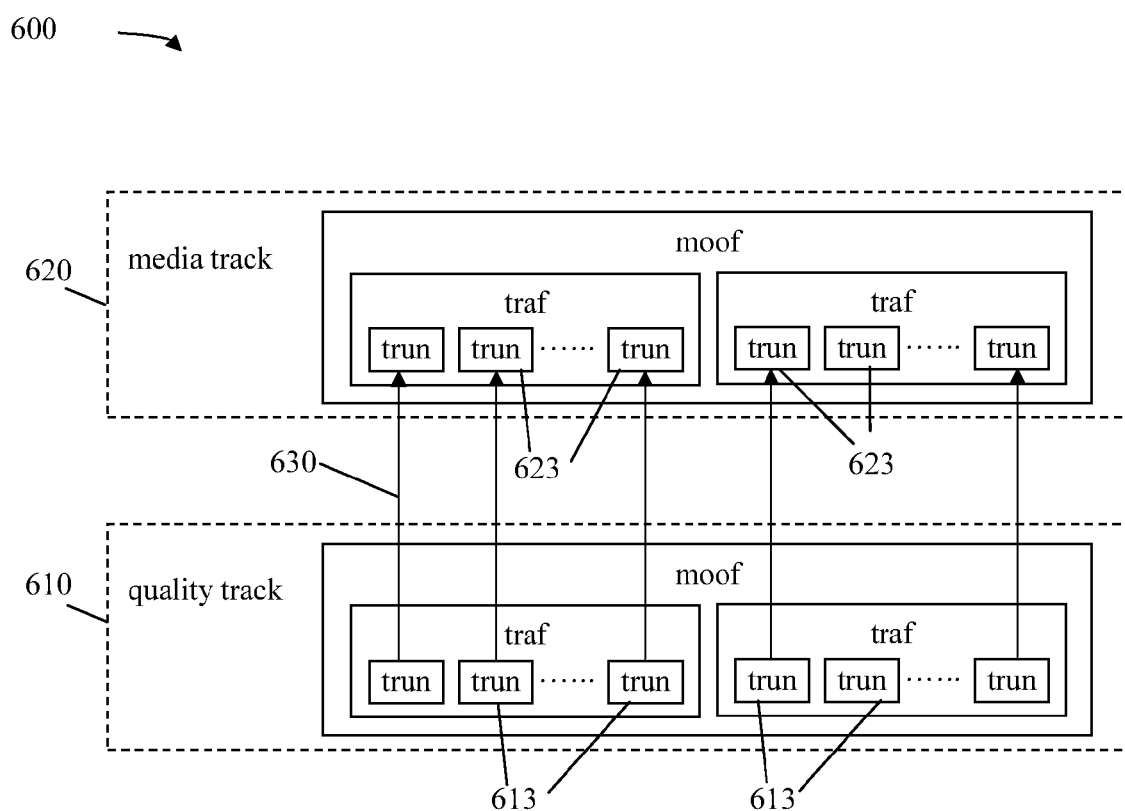
FIG. 6 illustrates an embodiment of an association method between a quality track and a media track at a track run granularity level.

FIG. 6 illustrates an embodiment of an association method 600 between a quality track 610 and a media track 620 at a track run granularity level. In method 600, the media track 620 and the quality track 610 may be substantially similar to media track 520 and quality track 510, respectively. However, the quality track 610 may comprise quality information at a coarser granularity than quality track 510. The quality track 610 may comprise a plurality of quality metrics 630 corresponding to coding quality of track runs 623 (e.g. track runs 523) in the media track 620. In the quality track 610, each quality metric 630 may be embedded in a track run 613, which may be associated with a track run 623 in which the coding quality is described by the quality metric 630. In other words, each quality metric 630 may be associated with an entire track run 613 instead of with a specific sample as in method 500.

Figure 7:
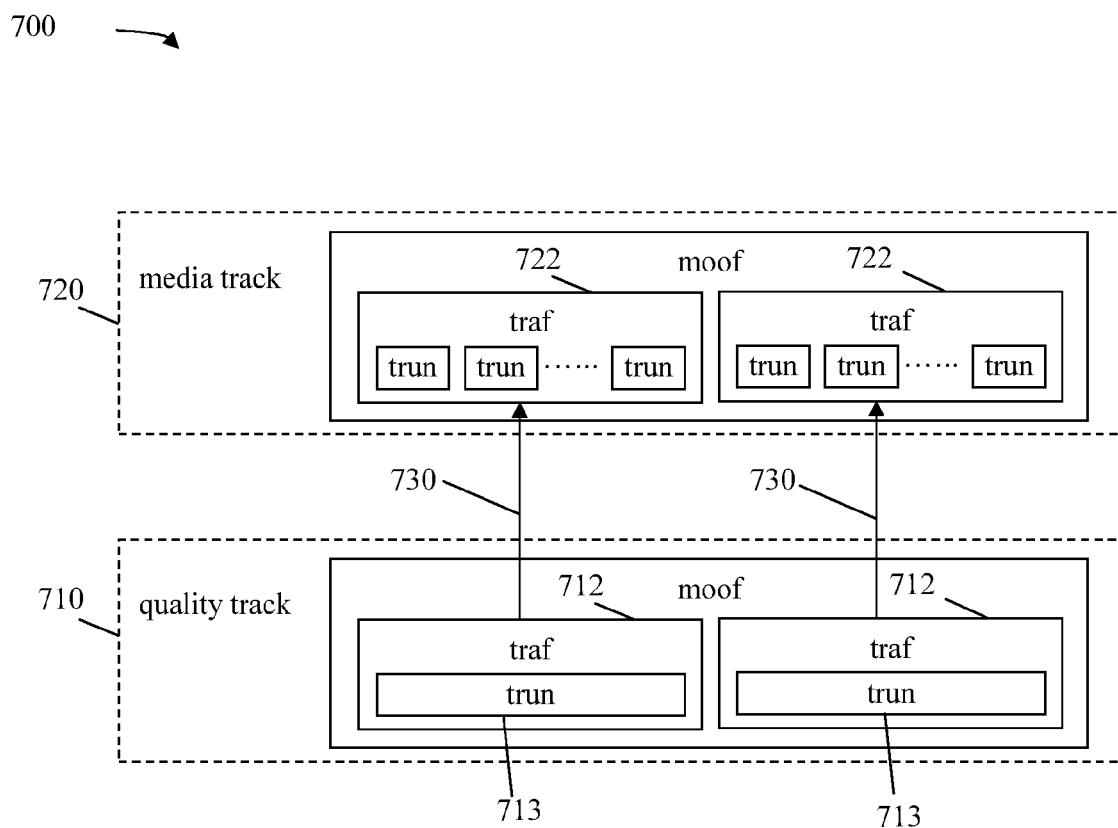
FIG. 7 illustrates an embodiment of an association method between a quality track and a media track at a track fragment granularity level.

FIG. 7 illustrates an embodiment of an association method 700 between a quality track 710 and a media track 720 at a track fragment granularity level. In method 700, the media track 720 and the quality track 710 may be substantially similar to media track 620 and quality track 610, respectively. However, the quality track 710 may comprise quality information at a coarser granularity than quality track 610. The quality track 710 may comprise a plurality of quality metrics 730 corresponding to coding quality of track fragments 722 (e.g. track fragments 522) in the media track 720. For example, each quality metric 730 may apply to an entire track fragment 712 instead of a track run as in method 600. In the quality track 710, each quality metric 730 may be embedded in a track run 713 and the track run 713 may be embedded in a track fragment 712, which may be associated with a track fragment 722 in which the coding quality is described by the quality metric 730.

Figure 8:
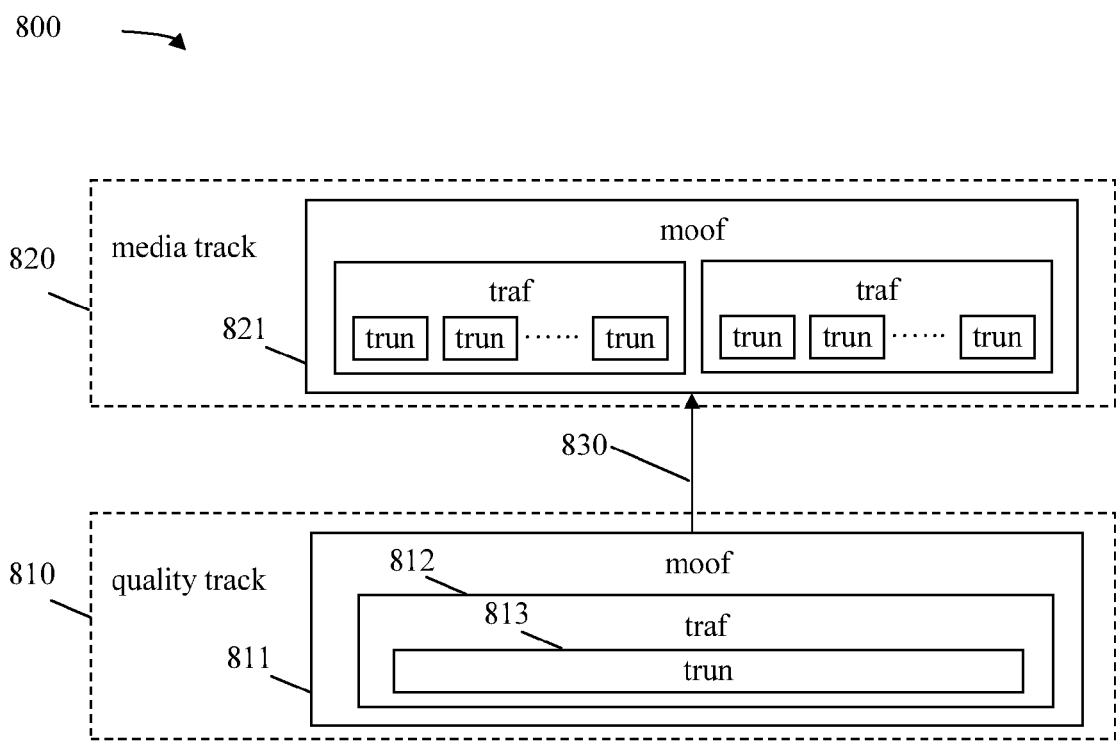
FIG. 8 illustrates an embodiment of an association method between a quality track and a media track at a movie fragment granularity level.

FIG. 8 illustrates an embodiment of an association method 800 between a quality track 810 and a media track 820 at a movie fragment granularity level. In method 800, the media track 820 and the quality track 810 may be substantially similar to media track 720 and quality track 710, respectively. However, the quality track 810 may comprise quality information at a coarser granularity than quality track 710. The quality track 810 may comprise a quality metric 830 corresponding to coding quality of a movie fragment 821 (e.g. movie fragment 521) in the media track 820. For example, each quality metric 830 may apply to an entire movie fragment 811 instead of a track fragment as in method 700. In the quality track 810, the quality metric 830 may be embedded in a track run 813, the track run 813 may be embedded in a track fragment 812, and the track fragment 812 may be embedded in a movie fragment 811, which may be associated with the movie fragment 821.

Figure 9:
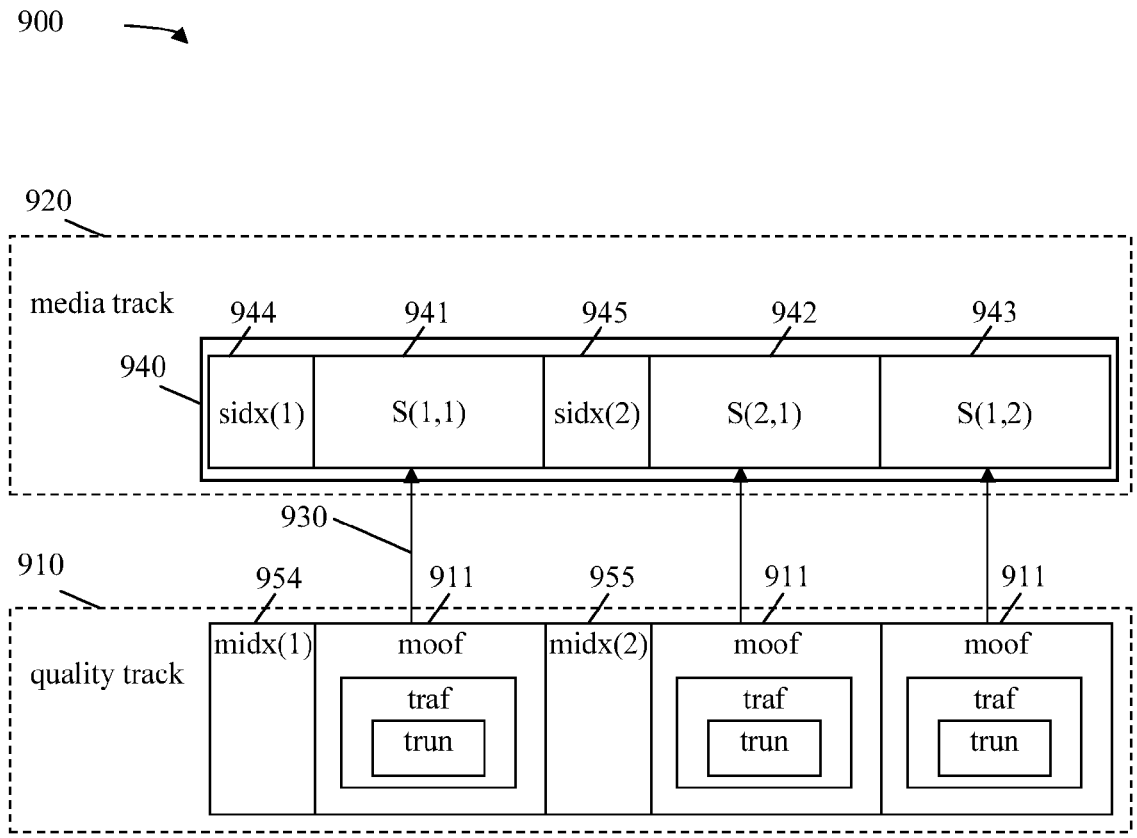
FIG. 9 illustrates an embodiment of an association method between a quality track and a media track at a sub-segment granularity level.

FIG. 9 illustrates an embodiment of an association method 900 between a quality track 910 and a media track 920 at a sub-segment granularity level. In method 900, the media track 920 may comprise a media segment 940. The segment 940 may comprise a plurality of sub-segments S(1,1) 941, S(2,1) 942, and S(2,2) 943. The sub-segments 941, 942, and 943 may be described (e.g. offsets, duration, etc.) by segment index boxes (sidx(1)) 944 and/or (sidx (2)) 945. For example, a segment index box 944 may be positioned at the beginning of the media track 920, a sub-segment 941 may be positioned next to the segment index box 944, a segment index box 945 may be positioned next to the sub-segment 941, a sub-segment 942 may be positioned next to the segment index box 945, and a sub-segment 943 may be positioned next to the sub-segment 942.

Segment index box 941 may be a first segment index box in the media track 920. The segment index box may describe the entirety of the media segment 940. Sub-segments 941, 942 and 943 may be referred to as indexed sub-segments since sub-segment 941 is preceded by segment index box 944 and sub-segment 942 is preceded by segment index box 945. Sub-segment 941 may be described by segment index box 944 and sub-segments 942 and 943 may be described by segment index box 945.

In method 900, the quality track 910 may comprise a substantially similar structure as the media track 920. For example, the quality track 910 may comprise a first metadata segment index box (midx(1)) 954 and a second metadata segment index box (midx(2)) 955. The quality track 910 may further comprise a plurality of quality metrics 930 corresponding to coding quality of the sub-segments 941, 942, and 943 in the media track 920. Each quality metric 930 may be stored as a movie fragment 911 in the quality track 910 via substantially similar mechanisms as in method 800 described herein above. In one embodiment, the metadata segment index boxes 954 and 955 may be substantially similar to the segment index boxes 944 and 945, respectively. In another embodiment, the metadata segment index boxes 954 and 955 may be extended to include descriptions of the sub-segments in the media track 920. It should be noted that the indexing of the sub-segments in a quality track 910 may be alternatively configured as determined by a person of ordinary skill in the art to achieve the same functionalities.

Figure 10:
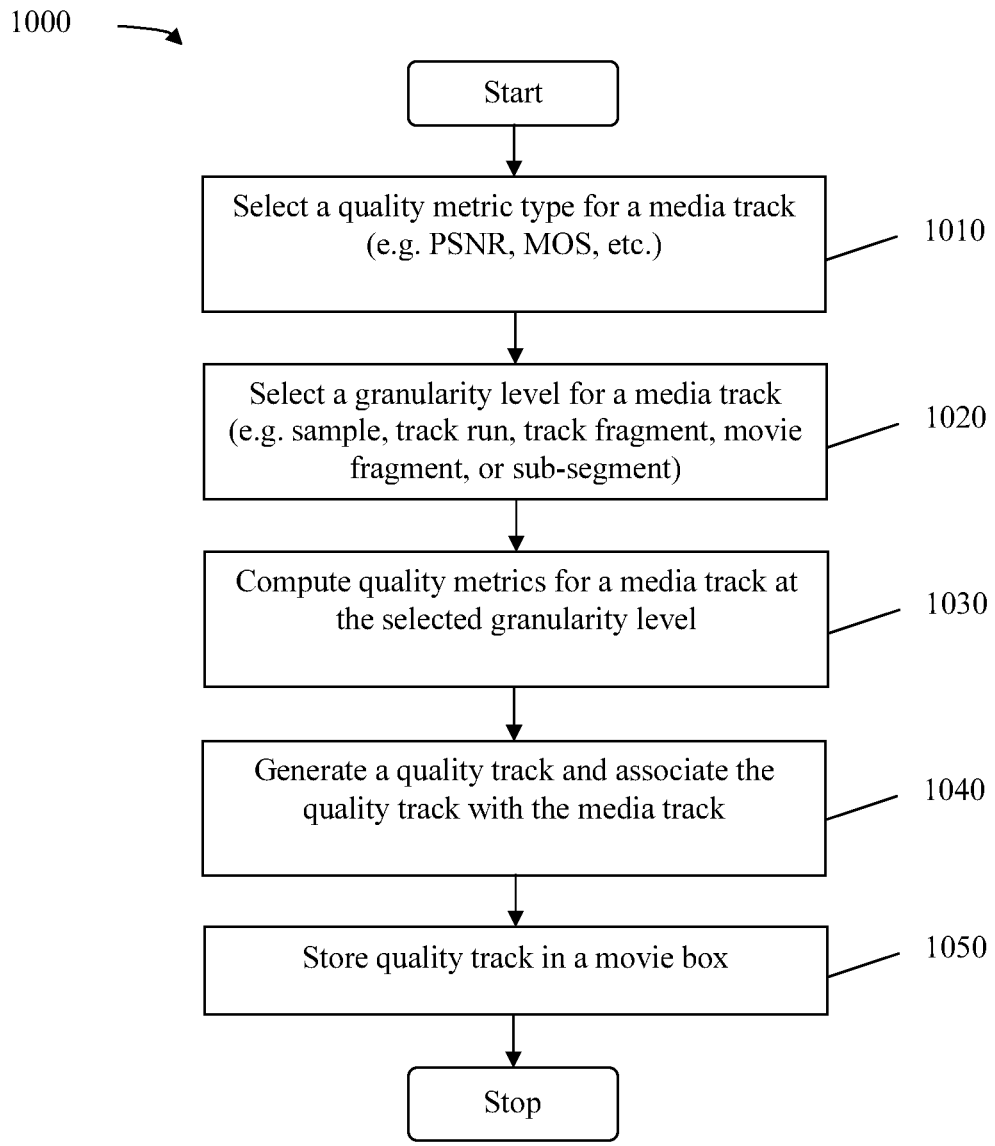
FIG. 10 is a flowchart of an embodiment of a content quality information management method.

FIG. 10 is a flowchart of an embodiment of a content quality information management method 1000, which may be implemented on a content preparation unit (e.g. content preparation unit 130), a content server (e.g. content server 110), and/or an NE 200 that manages content quality information. Method 1000 may be implemented for carrying quality information at a sample granularity, a track run granularity, a track fragment granularity, a movie fragment granularity, or a sub-segment granularity as described in method 500, 600, 700, 800, and/or 900, respectively. Method 1000 may begin with selecting a quality metric type for a media track (e.g. media track 520, 620, 620, 720, or 820) at step 1010, where quality metric type may be a PSNR, a MOS, etc. At step 1020, method 1000 may select a granularity level for describing quality information of the media track. For example, the granularity level may be a sample granularity level, a track run granularity level, a track fragment granularity level, a movie fragment granularity level, or a sub-segment granularity level. In some embodiments, a plurality of granularity levels may be selected, where the quality of different portions of the media track may be measured with different granularity levels.

At step 1030, method 1000 may compute quality metrics for the media track. The quality metrics may be of the selected quality metric type. Each quality metric may correspond to a unit of media data in the media track. For example, each quality metric may describe the quality of a sample in the media track when the selected granularity level is a sample granularity level. Each quality metric may describe the quality of a track run in the media track when the selected granularity level is a track run granularity level. Each quality metric may describe the quality of a track fragment in the media track when the selected granularity level is a track fragment granularity level. Each quality metric may describe the quality of a movie fragment in the media track when the selected granularity level is a sample granularity level. Each quality metric may describe the quality of a sub-segment in the media track when the selected granularity level is a sub-segment granularity level.

At step 1040, after computing the quality metrics, method 1000 may generate a quality track (e.g. quality track 510, 610, 710, 810, or 910). The computed quality metrics may be embedded in the quality track according to the selected granularity level. The quality metadata track may be associated with the media track and may be organized in substantially similar mechanisms as the media track (e.g. via association method 500, 600, 700, 800, or 900). For example, the media track may comprise a segment (e.g. segment 940) divided into a plurality of sub-segments (e.g. sub-segments 941, 942, or 943), where each sub-segment may comprise a plurality of movie fragments (e.g. movie fragments 521). Each movie fragment may comprise a plurality of track fragments (e.g. track fragment 522) and each fragment may comprise a plurality of track runs (e.g. track run 523). Each track run may comprise a plurality of samples (e.g. coded audio frame or video frame).

In an embodiment, the selected granularity level may be a sample granularity level. In such embodiment, method 1000 may embed the same number of quality metrics in each track run of the quality track as the number of samples in each track run of the media track, where each quality metric may correspond to a sample in the media track.

In another embodiment, the selected granularity level may be a track run granularity level. In such embodiment, method 1000 may embed one quality metric in each track run of the quality track, where quality metric may correspond to a track run in the media track.

In another embodiment, the selected granularity level may be a track fragment granularity level. In such embodiment, method 1000 may embed one track run in each track fragment and one quality metric in each track run, where each quality metric may correspond to a track fragment in the media track.

In another embodiment, the selected granularity level may be a movie fragment granularity level. In such embodiment, method 1000 may embed one track fragment in each movie fragment, one track run in each track fragment, and one quality metric in each track run, where each quality metric may correspond to a movie fragment in the media track.

In yet another embodiment, the selected granularity level may be a sub-segment granularity level. In such embodiment, method 1000 may embed one movie fragment in each sub-segment, one track fragment in each movie fragment, one track run in each track fragment, and one quality metric in each track run, where each quality metric may correspond to a sub-segment in the media track. In addition to the movie fragment box, method 1000 may generate one or more metadata segment index boxes (e.g. metadata segment index boxes 954 and/or 955) organized in substantially similar mechanisms as segment index boxes (e.g. segment index boxes 944 and/or 945) in the media track.

At step 1050, after generating the quality track, method 1000 may store the quality track as a separate metadata track in a quality track box (e.g. quality track box 413) and a quality data box (e.g. quality data box 423). It should be noted that method 1000 may be suitable for generating a quality track for any type (e.g. PSNR, MOS, etc.) of quality metrics and any granularity. In addition, persons of ordinary skill in the art are aware that the disclosure is not limited to one value for each quality metric, but rather may comprise a group of values (e.g. of different types of quality metrics) corresponding to a unit of media data in the media track, where the duration of the unit may depend on a selected granularity.

Figure 11:
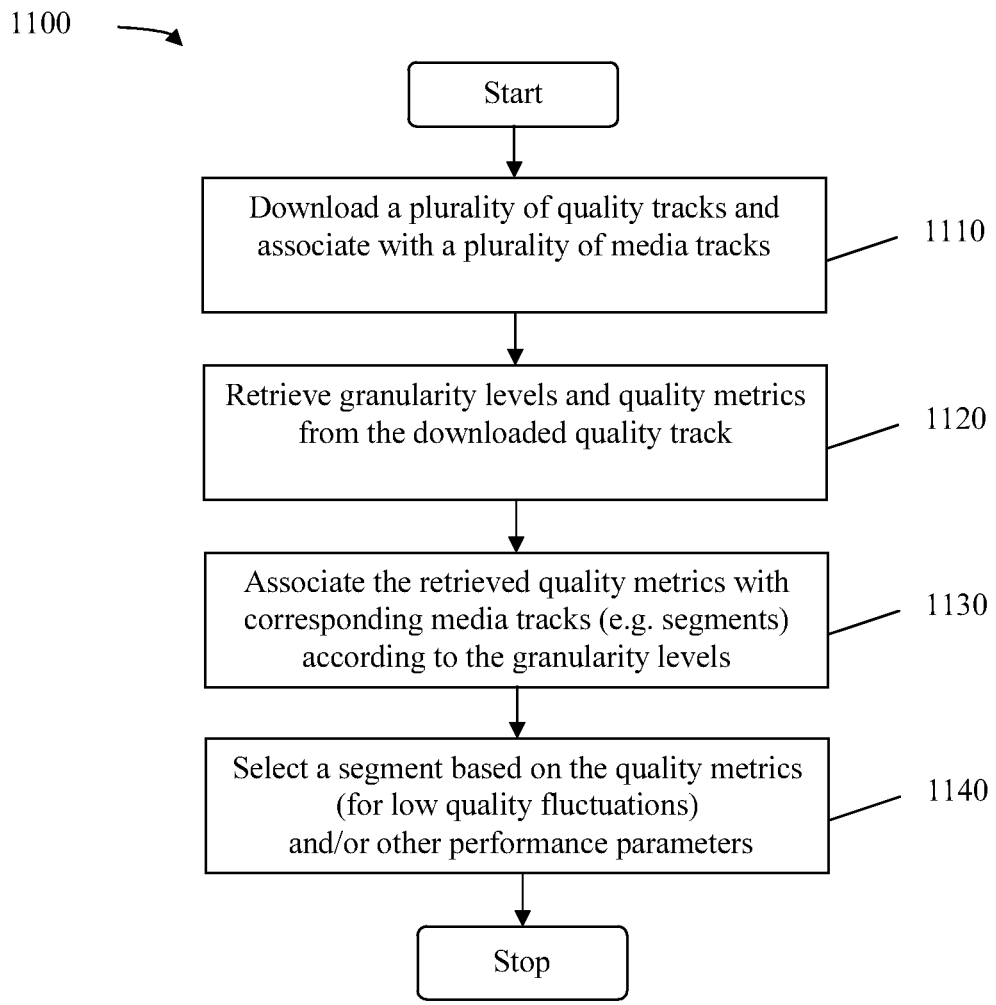
FIG. 11 is a flowchart of another embodiment of a content quality information management method.

FIG. 11 is a flowchart of an embodiment of a content quality information management method 1100, which may be implemented on a content client (e.g. content client 120) or an NE 200 that manages quality information for a content client. For example, method 1100 may be employed during segment selections in dynamic adaptive streaming applications. Method 1100 may begin with downloading a plurality of quality tracks (e.g. quality tracks 510, 610, 710, 810, or 910) at step 1110, where each quality track may be associated with a media track. For example, the segments may correspond to different representations (e.g. encoded versions) of a media presentation. At step 1120, method 1100 may retrieve granularity levels and quality metrics from the downloaded quality tracks. At step 1130, method 1100 may associate the retrieved quality metrics to corresponding media tracks (e.g. media track 520, 620, 720, 820, or 920). The association may be performed according to the granularity level in substantially similar mechanisms as in association method 500, 600, 700, 800, or 900 described herein above. At step 1140, method 1100 may select a segment (e.g. encoded version) which may produce quality that is most consistent (e.g. reduce quality fluctuations in media playback) with previously rendered segments according to the retrieved quality metrics. It should be noted that method 1100 may continue to employ network conditions, bit rate information, and/or any other available resources for segment selection. For example, method 1100 may apply some weighted functions to a plurality of performance parameters associated with the media segments to compute a final score for segment selection.

In an embodiment, a quality track (e.g. quality track 510, 610, 710, 810, or 910) may be described by a data structure comprising parameters, such as quality metric type, granularity level, and scale factor. Each sample in the quality track may comprise a quality value, where the quality value may be of the quality metric type. In addition, each sample may indicate a scale factor for the quality value, where the scale factor may be a multiplication factor that scales the range of the quality values. The quality track may also comprise metadata segment index boxes (e.g. metadata segment index boxes 954 and/or 955) and the metadata segment index boxes may comprise substantially similar structure as segment index box as defined in ISO document IEC 14496-12.

Figure 12:
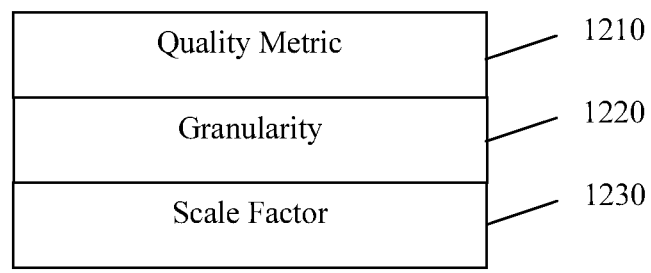
FIG. 12 is a schematic diagram of an embodiment of a quality metadata track description data structure.

FIG. 12 is a schematic diagram of an embodiment of a quality metadata track description data structure 1200, which may be stored in a quality track box (e.g. quality track box 413) in a media file (e.g. media file 400). Data structure 1200 may describe a format for indicating global information of a quality track (e.g. quality track 510, 610, 710, 810, or 910) in a media file. Data structure 1200 may comprise a quality metric field 1210, a granularity field 1220, and a scale factor field 1230. The quality metric field 1210 may be about eight bits long and may be an unsigned integer value. The quality metric field 1210 may indicate the type of quality metric (e.g. PSNR, MOS, etc.) carried in the quality track. The granularity field 1220 may be about eight bits long and may be an unsigned integer value. The granularity field 1220 may indicate a granularity level of the quality metrics carried in the quality track. For example, the granularity field 1220 may be set to a value of one to indicate a sample granularity level, a value of two to indicate a track run granularity level, a value of three to indicate a track fragment granularity level, a value of four to indicate a movie fragment granularity level, and/or a value of five to indicate a sub-segment granularity level. The scale factor field 1230 may be about eight bits long and may be an unsigned integer value. The scale factor field 1230 may indicate a factor, for example, a multiplication factor which may be applied to the quality metric values in the quality track.

Figure 13:
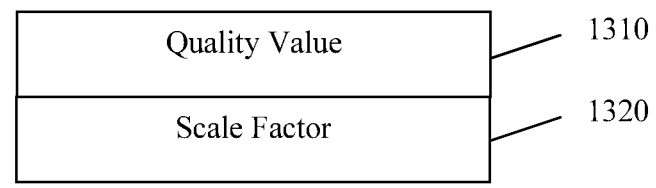
FIG. 13 is a schematic diagram of an embodiment of a quality metadata sample data structure.

FIG. 13 is a schematic diagram of an embodiment of a quality metadata sample data structure 1300, which may be stored in a quality data box (e.g. quality data box 423) in a media file (e.g. media file 400). Data structure 1300 may describe a format for indicating quality metadata samples of a quality track (e.g. quality track 510, 610, 610, 710, or 810) in a media file. Data structure 1300 may comprise a quality value field 1310 and a scale factor field 1320. The quality value field 1310 may be about eight bits long and may be an unsigned integer value. The quality value field 1310 may be a value of a quality metric (e.g. in data structure 1200). The scale factor field 1320 may be about eight bits long and may be an unsigned integer value. The scale factor field 1320 may indicate a scale factor that may be applied to the quality value field 1310. For example, the scale factor field 1320 may be set to a value of zero to indicate that a scale factor field (e.g. scale factor field 1230) indicated in a quality metadata track description data structure (e.g. data structure 1200) of the quality track may be applied to the quality value field 1310, otherwise the scale factor field 1320 may be applied to the quality value field 1310.

Figure 14:
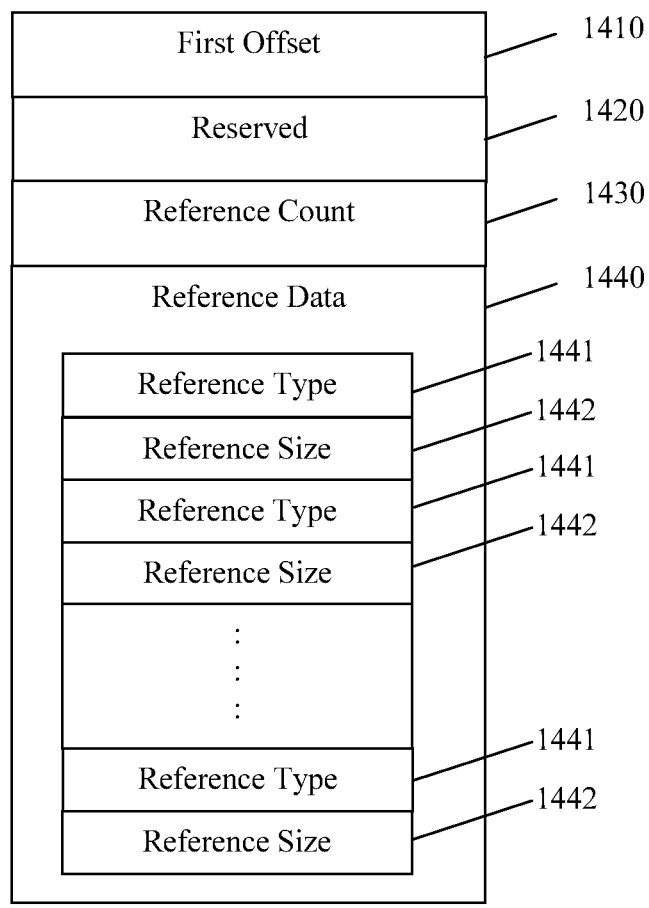
FIG. 14 is a schematic diagram of an embodiment of a metadata segment index data structure.

FIG. 14 is a schematic diagram of an embodiment of a metadata segment index data structure 1400, which may be stored in a quality track box (e.g. quality track box 413) in a media file (e.g. media file 400). Data structure 1400 may describe a format for encoding a metadata segment index box (e.g. metadata segment index box 954 and/or 955) of a quality track (e.g. quality track 510, 610, 710, 810, or 910) in a media file. Data structure 1400 may comprise a first offset field 1410, a reserved field 1420, a reference count field 1430, and a plurality of reference data 1440. The first offset field 1410 may be about thirty two bits long or about sixty four bits long depending on a version of a specification (e.g. ISO document IEC 14496-12) referenced by the media file. The first offset field 1410 may indicate a number of bytes offset from an anchor point to the first byte (e.g. starting point) of an item (e.g. quality metadata) described or referenced by the metadata segment index box. The reference count field 1430 may be about sixteen bits long and may be an unsigned integer value.

The reference data field 1440 may comprise a plurality of reference data pairs comprising a reference type field 1441 and a reference size field 1442. The reference count field 1430 may indicate the number of reference data pairs in the data structure 1400. The reference type field 1441 may be about one bit long and may indicate the anchor point referred to by the first offset field 1410. For example, the reference type field 1441 may be set to a bit-value of one to indicate the anchor point is a metadata segment index box, otherwise the reference type field 1441 may indicate the anchor point is a movie fragment box, which may be stored in a different file from the metadata segment index box. The reference size field 1442 may be about thirty one bits long and may be an unsigned integer value. The reference size field 1442 may indicate the number of bytes (e.g. length) from the first byte of the referenced item (e.g. quality metadata) to the first byte of the next referenced item. When the reference item is a last entry of the referenced material (e.g. the quality track), the reference size field 1442 may indicate the number of bytes (e.g. length) from the first byte of the referenced item to the end of the referenced material.

In an embodiment of coding for moving pictures and audio, a method for carrying quality information content in ISO-BMFF as defined in ISO/IEC document, titled "Carriage of Quality Information of Content in the ISO Base Media File Format" by Shaobo Zhang, et. al, which is incorporated herein by reference, may employ a quality metadata track. Quality information of content may be defined as metadata associated with the content. A quality metadata track may be introduced in the ISOBMFF and a box format may be defined (e.g. quality metadata sample format) for the quality metadata track. The design may follow rules of defining a track within an ISOBMFF framework. Quality information may be provided on five different levels, which may include sample, track run, track fragment, movie fragment, and sub-segment. Sample, track run, track fragment, movie fragment, and sub-segment may be in an increasing order of embedding relationship. The syntax for a quality metadata track may be defined as shown below:

```
Aligned(8) class QualityMetaDataSampleEntry( ) extends
MetaDataSampleEntry ('metq')
{
    unsigned int(8)   quality_metric;
    unsigned int(8)   granularity;
    unsigned int(8)   scale_factor;
}
```

The quality_metric may indicate the metric (e.g. PSNR, MOS) used for quality measurement. The granularity may indicate a level at which the quality metadata track describes media track's quality. The granularity may comprise a value of one for sample level quality description, a value of two for track run level quality description, a value of three for track fragment level quality description, a value of four for movie fragment level quality description, and a value of five for sub-segment level quality description. A quality metadata track may be carried in a different movie fragment from the one carrying the media track described by the quality metadata track.

When the granularity in a metadata track equals a value of one, the number of movie fragments, the number of track fragments in each movie fragment, the number of track runs in each track fragments, and the number of samples in each track run may be the same as the media track described by the metadata track. A one-to-one mapping may exist between a metadata track and the media track which the metadata track describes on levels of movie fragments, track fragment, track run, and sample.

When the granularity in a metadata track equals a value of two, the number of movie fragments, the number of track fragments in each movie fragment, and the number of track runs in each track fragments may be the same as the media track described by the metadata track. The metadata track may comprise one sample in each track run. A one-to-one mapping may exist between a metadata track and the media track which the metadata track describes on levels of movie fragments, track fragment, and track run.

When the granularity in a metadata track equals a value of three, the number of movie fragments, and the number of track fragments in each movie fragment may be the same as the media track the metadata track describes. The metadata track may comprise one track run in each track fragment and one sample in each track run.

When the granularity in a metadata track equals to a value of four, the number of movie fragments in the metadata track may be the same as the media track described by the metadata track. The metadata track may comprise one track fragment per movie fragment, one track run per track fragment, and one sample per track run.

When the granularity in a metadata track equals a value of five, the quality metadata track may provide quality information of a reference media track on a sub-segment level. Both the metadata track and the reference media track may use segment indexes in segments. The segment index in the metadata track 'midx' may be of similar structure as an index in the media track. Each sub-segment in the reference media track may correspond to a sub-segment in the metadata track, which may carry one movie fragment comprising the associated metadata track. The metadata track may comprise one track run per track fragment and one sample per track run.

It should be note that 'sidx' may be extended for use in a metadata track. The ISO document IEC 14496-12 may employ 'sidx' in media tracks. However, it may be reused to indicate size of reference media data ('referenced_size' indicates size of metadata not of media data).

The quality metadata sample format may be described as shown below:

```
aligned(8) class QualitySample {
    unsigned int(8)   quality_value;
    unsigned int(8)   scale_factor;
}
```

The quality_value may indicate the value of a quality metrics. The scale_factor may indicate the scale factor of the quality value. When the value of a scale_factor equals to zero, the value in the default scale_factor in a sample description box may take effect. When the value of the scale_factor is other than a value of zero, the scale_factor may override the default scale_factor in the sample description box.

The segment index for a metadata track may be described as shown below:

```
aligned(8) class SegmentIndexBox extends FullBox('midx', version, 0) {
    if (version==0) {
        unsigned int(32) first_offset;
    }
    else {
        unsigned int(64) first_offset;
    }
    unsigned int(16) reserved = 0;
    unsigned int(16) reference_count;
    for(i=1; i <= reference_count; i++)
    {
        bit (1)           reference_type;
        unsigned int(31)  referenced_size;      }
}
```

The first_offset may indicate the distance in bytes from the anchor point to the first byte of the indexed material. The reference_type may be set to a value of one to indicate that the reference may be to a metadata segment index ('midx') box. Otherwise the reference may be to a sub-segment in a reference media track (e.g. in the case of files based on the ISO document IEC 14496-12, to a movie fragment box). The referenced_size may indicate the distance in bytes from the first byte of the referenced item to the first byte of the next referenced item, or in the case of the last entry, the end of the referenced material.

In an embodiment, the quality information derived from a media track may be evaluated according to ISO/IEC documents titled "m26926 Proposed test sequences and framework for DASH CE on quality signalling, Shanghai, October, 2012", "m28172 Experiment Results on Quality Driven Streaming, Geneva, January, 2013", and "w13286 Descriptions of Core Experiments, Geneva, January, 2013", all of which are incorporated herein by reference as if reproduced in their entirety.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means ±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for managing quality information for dynamic adaption in a content delivery network element, comprising:
    selecting, via a hardware processor of the content delivery network element, one or more granularity levels for a media track comprising encoded media data;
    computing, via the hardware processor, a plurality of quality metrics for the encoded media data at the selected granularity levels, wherein the quality metrics are measures of coding quality of the encoded media data;
    generating, via the hardware processor, a quality track corresponding to the media track at the selected granularity levels, the quality track comprising the plurality of quality metrics;
    storing the quality track on a storage device of the network element separate from the media track; and
    transmitting, via a transmitter of the content delivery network element, the quality track to a client device to inform selection of the encoded media data,
    wherein the quality track comprises a granularity field that indicates a granularity level of the quality metrics, and
    wherein the granularity field is able to be set to a first value to indicate a sample granularity level, set to a second value to indicate a track run granularity level, set to a third value to indicate a track fragment granularity level, set to a fourth value to indicate a movie fragment granularity level, and set to a fifth value to indicate a sub-segment granularity level.

2. The method of claim 1, wherein each granularity level corresponds to a different portion of the encoded media data, and wherein the quality track comprises an association between the quality metrics and the encoded media data at the selected granularity levels.

3. The method of claim 1, wherein the encoded media data comprises a timed sequence of samples, wherein the samples are grouped into one or more track runs, wherein the track runs are grouped into one or more track fragments, wherein the track fragments are grouped into one or more movie fragments, and wherein the movie fragments are grouped into one or more sub-segments.

4. The method of claim 3, wherein the selected granularity levels comprise a sample time interval, and wherein computing the plurality of quality metrics comprises measuring coding quality for each encoded media data sample.

5. The method of claim 3, wherein the selected granularity levels comprise a track run time interval, wherein computing the plurality of quality metrics comprises measuring coding quality for each encoded media data track run.

6. The method of claim 3, wherein the selected granularity levels comprise a track fragment time interval, wherein computing the plurality of quality metrics comprises measuring coding quality for each encoded media data track fragment.

7. The method of claim 3, wherein the selected granularity levels comprise a movie fragment time interval, wherein computing the plurality of quality metrics comprises measuring coding quality for each encoded media data movie fragment.

8. The method of claim 3, wherein the selected granularity levels comprise a sub-segment time interval, wherein computing the plurality of quality metrics comprises measuring coding quality for each encoded media data sub-segment.

9. The method of claim 1, wherein the coding quality comprises a peak signal-to-noise-ratio (PSNR), a mean opinion score (MOS), or combinations thereof.

10. The method of claim 1, wherein the quality track indicates dynamic adaptation factors for transmitting segments of the media track to the client device via a network.

11. A network device, configured to act as a media server, and comprising:
a hardware processor configured to:
select one or more granularity levels for an encoded media data in a media data track;
compute a plurality of quality metrics that indicate coding quality of the encoded media data by measuring the encoded media data at the selected granularity-level; and
generate a quality track corresponding to the media track at the selected granularity levels, the quality track comprising the plurality of quality metrics;
a memory coupled to the processor and configured to store the quality track separately from other tracks associated with the encoded media data, wherein the quality track comprises a one-to-one mapping association with the encoded media data at the selected granularity levels; and
a transmitter coupled to the processor and the memory and configured to send the quality track towards a client device to inform selection of the encoded media data, wherein the quality track comprises a granularity field that indicates a granularity level of the quality metrics, and wherein the granularity field is able to be set to a first value to indicate a sample granularity level, set to a second value to indicate a track run granularity level, set to a third value to indicate a track fragment granularity level, set to a fourth value to indicate a movie fragment granularity level, and set to a fifth value to indicate a sub-segment granularity level.

12. The network device of claim 11, wherein the encoded media data comprises a timed sequence of samples, wherein the granularity levels are time interval granularities, and wherein a minimum granularity is one sample.

13. The network device of claim 11, wherein the encoded media data comprises one or more encoded versions of a source media data, and wherein the quality track comprises the quality metrics for one or more of the encoded versions.

14. The network device of claim 11, wherein the encoded media data comprises one or more encoded versions of a source media data, and wherein the network device further comprises a receiver configured to:
receive a first message comprising a request for accessing the quality track; and
receive a second message comprising a selection of one of the encoded versions based on the quality metrics in the quality track.

15. A method for communicating quality information of a media data in a file format implemented in a media server, the method comprising:
deriving, via a hardware processor of the media server, the quality information of the media data on different granularity levels for different portions of the media data, wherein the media data comprises digitally encoded media content;
decoupling the quality information from the media data by storing the quality information in a quality metadata track;
associating the quality metadata track to a media track that carries the media data such that a mapping exists between the quality metadata track and the media track at each of the granularity levels; and
transmitting, via a transmitter coupled to the hardware processor, the quality metadata track to a client device to inform selection of the media data in the media track,
wherein the quality metadata track comprises a granularity field that indicates a granularity level of the quality information carried in a portion of the quality metadata track, and
wherein the granularity field is able to be set to a first value to indicate a sample granularity level, set to a second value to indicate a track run granularity level, set to a third value to indicate a track fragment granular level, set to a fourth value to indicate movie fragment granularity level, and set to a fifth value to indicate a sub-segment granularity level.

16. The method of claim 15, the quality metadata track comprises a quality metadata track description formatted data comprising:
a quality metric that indicates a metric used for quality measurement; and
a first scale factor of the quality metric.

17. The method of claim 16, wherein the granularity levels comprise a sample level quality description, a track run level quality description, a track fragment level quality description, a movie fragment level quality description, or a sub-segment level quality description.

18. The method of claim 16, the quality metadata track further comprises a plurality of quality metadata sample formatted data blocks, wherein each data block comprises:
a quality value that indicates a value of the quality metric; and a second scale factor of the quality value that overrides the first scale factor in the quality metadata track description formatted data.

19. The method of claim 15, the quality metadata track comprises a segment index for the quality metadata track, wherein the segment index comprises:
- a first offset that indicates a distance in bytes from an anchor point to a first byte of an indexed material;
- a reference count; and
- one or more referenced items as indicated by the reference count, wherein each referenced item comprises:
  - a reference type that indicates whether a reference is to a metadata segment index box or to a sub-segment in the media track; and
  - a reference size that indicates a distance in bytes from a first byte of the referenced item to a first byte of a next referenced item or to an end of a reference material when the referenced item is a last entry.

20. The method of claim 19, wherein the segment index further comprises a field to indicate a size of the media data.

* * * * *

UNITED STATES PATENT AND TRADEMARK OFFICE
CERTIFICATE OF CORRECTION

PATENT NO. : 9,521,469 B2
APPLICATION NO. : 14/256650
DATED : December 13, 2016
INVENTOR(S) : Zhang et al.

It is certified that error appears in the above-identified patent and that said Letters Patent is hereby corrected as shown below:

In the Claims

Column 20, Lines 23-51, Claim 15, should read:
15. A method for communicating quality information of a media data in a file format implemented in a media server, the method comprising:
    deriving, via a hardware processor of the media server, the qualify information of the media data on different granularity levels for different portions of the media data, wherein the media data comprises digitally encoded media content;
    decoupling the quality information from the media data by storing the quality information in a quality metadata track;
    associating the quality metadata track to a media track that carries the media data such that a mapping exists between the quality metadata track and the media track at each of the granularity levels; and
    transmitting, via a transmitter coupled to the hardware processor, the quality metadata track to a client device to inform selection of the media data in the media track,
    wherein the quality metadata track comprises a granularity field that indicates a granularity level of the quality information carried in a portion of the quality metadata track, and
    wherein the granularity field is able to be set to a first value to indicate a sample granularity level, set to a second value to indicate a track run granularity level, set to a third value to indicate a track fragment granularity level, set to a fourth value to indicate a movie fragment granularity level, and set to a fifth value to indicate a sub-segment granularity level.

Signed and Sealed this
Twenty-first Day of March, 2017

Michelle K. Lee
*Director of the United States Patent and Trademark Office*